United States Patent [19]
Lees et al.

[11] Patent Number: 5,146,321
[45] Date of Patent: Sep. 8, 1992

[54] LINEAR FILM SCANNER OPERABLE AT DIFFERENT LINE RATES

[75] Inventors: Roger T. Lees, Rickmansworth; Walter R. Godden, Chorleywood; Ronald W. J. Mumford, deceased, late of Hitchin, by Shalagh Mary Mumford, personal representative; John D. Millward, Hitchin, all of United Kingdom

[73] Assignee: Eastman Kodak Company, Rochester, N.Y.

[21] Appl. No.: 713,925

[22] Filed: Jun. 12, 1991

[51] Int. Cl.⁵ ............................................. H04N 9/11
[52] U.S. Cl. ..................................... 358/54; 358/11
[58] Field of Search ............... 358/54, 214, 212, 140, 358/11

[56] References Cited

U.S. PATENT DOCUMENTS

| | | | |
|---|---|---|---|
| 4,051,531 | 9/1977 | Baldwin | 358/140 |
| 4,733,299 | 3/1988 | Glenn | 358/140 |
| 4,868,657 | 9/1989 | Samuels | 358/140 |
| 4,876,596 | 10/1989 | Faroudja | 358/140 |
| 4,881,125 | 11/1989 | Krause | 358/141 |
| 5,023,711 | 6/1991 | Erhardt | 358/54 |
| 5,045,932 | 9/1991 | Sharman | 358/76 |

OTHER PUBLICATIONS

Sakata, H. et al., "Television Standards Converter Using Delay-line System," NHK Laboratories Note, Aug. 1967.

Primary Examiner—Howard W. Britton
Assistant Examiner—Sherrie Hsia
Attorney, Agent, or Firm—David M. Woods

[57] ABSTRACT

A film scanner operable according to dual line standards includes red, green, and blue linear array sensors separated by a line spacing that constitutes substantially integral first and second multiples of the line spacings of the respective line standards. More particularly, in 1125 and 1250 line television standards, the linear arrays are spaced such that the distance is substantially equivalent to 9 lines of the 1125 line standard and 10 lines of the 1250 line standard. The output signal from each linear array is registered to the same line for each standard by inserting separable sets of line delays into the signal paths from two of the linear arrays. The separable delays correspond to the first and second multiples of the respective standards. By switching between the respective sets of delays, an output signal is developed for a selected line standard.

15 Claims, 4 Drawing Sheets

LINEAR FILM SCANNER OPERABLE AT DIFFERENT LINE RATES

BACKGROUND OF THE INVENTION

1. Technical Field

This invention pertains to the field of electronic image generation and, more particularly, to scanning apparatus for producing television picture signals from a film original and to signal processing techniques for use therewith.

2. Background Art

Although generally useful in the electronic imaging art, this invention has special application to a linear array film scanner used in a telecine machine for producing a television signal from a motion picture film. A linear array film scanner typically uses a light-sensitive linear charge-coupled device (CCD), which provides a serial output representing a line of a television raster. For color television, a film scanner usually includes an assembly of three separate CCD arrays, one each for red, green and blue. The film is driven at a uniform rate between the linear array assembly and a light source in a direction perpendicular to the linear dimension of the sensor arrays. The film motion provides the vertical (frame or page) scan and the linear cycling of the CCD arrays provides the horizontal (line) scan.

In one type of film scanner, the three CCD arrays are separate devices and a beam splitting optical system images an illuminated section of film on each CCD array. Changing the television standard according to which the film scanner is operating merely requires a change in the line integration time for the linear arrays, resulting in a change in effective spacing of the lines on the film. No physical rearrangement of the sensors is necessary. Instead of using separate linear devices, it is also known to use three CCD line sensors formed on a single solid state substrate. Because different illuminated sections of the film are imaged on the respective line sensors, the signals output from the sensors must be corrected by using shift registers or memory to obtain identical timing in the vertical direction. Despite the difficulty of registration, minimizing use of beamsplitters is highly desirable for high definition scanning because light loss due to absorption and scattering in the beam splitting process can be reduced.

An example of a high definition film scanner having separate linear devices on a common substrate is described in Ser. No. 373,309, filed May 29, 1989 in the names of R. A. Sharman and R. T. Lees, assigned to the same assignee as the present invention, and incorporated herein by reference (Ser. No. 373,309 is a commonly owned application for which the issue fee has been paid). According to this disclosure, a motion picture film scanner generates a high definition television signal from the combination of a high definition detail component and a plurality of lower definition color components. The detail component is obtained from a luminance signal generated by a linear array sensor having a line resolution suitable for high definition scanning. The lower definition color components are obtained from three low resolution linear array sensors supported on a common substrate for producing unsharp red, green and blue signals. The output high definition television signal is a combination of the detail component and the three color components.

In a film scanner of the type disclosed in Ser. No. 373,309, the spacing of the color arrays on the substrate is generally selected to be an integral number of scanning lines for a particular television line standard. In current high definition television development, there are two main standards under discussion: one based on 1250 scanning lines and the other based on 1125 scanning lines. The fixed spacing of the linear color arrays impose obvious limitations on the ease with which different television line standards can be accommodated. The problem is currently overcome in two ways:

1. By making a linear array sensor suited to one television line standard and then obtaining other standards by electronic interpolation. The principles of such line standard conversion by interpolation are well known, as shown, e.g., by U.S. Pat. No. 4,051,531; or
2. By using different sensors each suited to one standard only.

In either way of currently overcoming the standards problem, the vertical displacement of the linear arrays in the direction of film motion is selected to be equal to an integral number of scanning lines of one of the two standards. The task of bringing the signals from the displaced arrays into vertical registration is then done by providing line delays in the subsequent signal processing electronics. For instance, if the three color arrays are separated from each other by one scanning line, the output from the array providing the current scan is undelayed, the output from the intermediate array one line back is delayed by one line, and the output from the outer array two lines back is delayed by two lines. (For reasons associated with the design and fabrication of sensor chips, the array spacing selected for such a multi-array sensor will ordinarily be greater than one scanning line, and may typically be greater than 4 lines.)

SUMMARY OF THE INVENTION

The array spacing can be increased further within the limits set by a practical size of chip layout and an acceptable number of electronic line delay elements. Such an increase in array spacing beyond the minimum required by chip fabrication considerations allows the possibility that the array spacing could be chosen to be an integral number of lines for a first line standard while still being an approximately integral, but different, number of lines for a second standard. The approximation involved can usually be made as close as is required for any two line standards if an indefinite increase in the array spacing is permitted; however, a good approximation is possible in practice with only a modest sensor size.

The process of switching between the line standards involves increasing or decreasing the number of lines of electronic delay provided in the signal processing electronics. The required switchable electronic line delays are relatively simple and economic to provide. Dual standard operation is therefore obtained without electronic interpolation while retaining the advantage of a system utilizing several arrays on a common substrate.

More particularly, the invention provides a color image sensing apparatus for scanning a color original in a vertical scanning direction according to either of two television standards, each standard defining an appropriate television line spacing. In relation to the line sensor, the invention is embodied by a plurality of linear arrays that are separated in a page scanning direction by a predetermined spacing that constitutes substantially integral first and second multiples of the line spacing of the respective standards. In relation to the entire line scanning apparatus, the invention further involves registering the output signal from each linear array to the same television line by inserting first and second line delays into the signal path of at least one of the output signals, the line delays corresponding to the first and second integral multiples of the line spacing of the respective standards. In response to the television standard in use, the system switches between the respective line delays, whereby a standard output signal for the standard in use is taken from the corresponding delay.

BRIEF DESCRIPTION OF THE DRAWINGS

The invention will be described in relation to the drawings, in which.

BEST MODE FOR CARRYING OUT THE INVENTION

Figure 1:
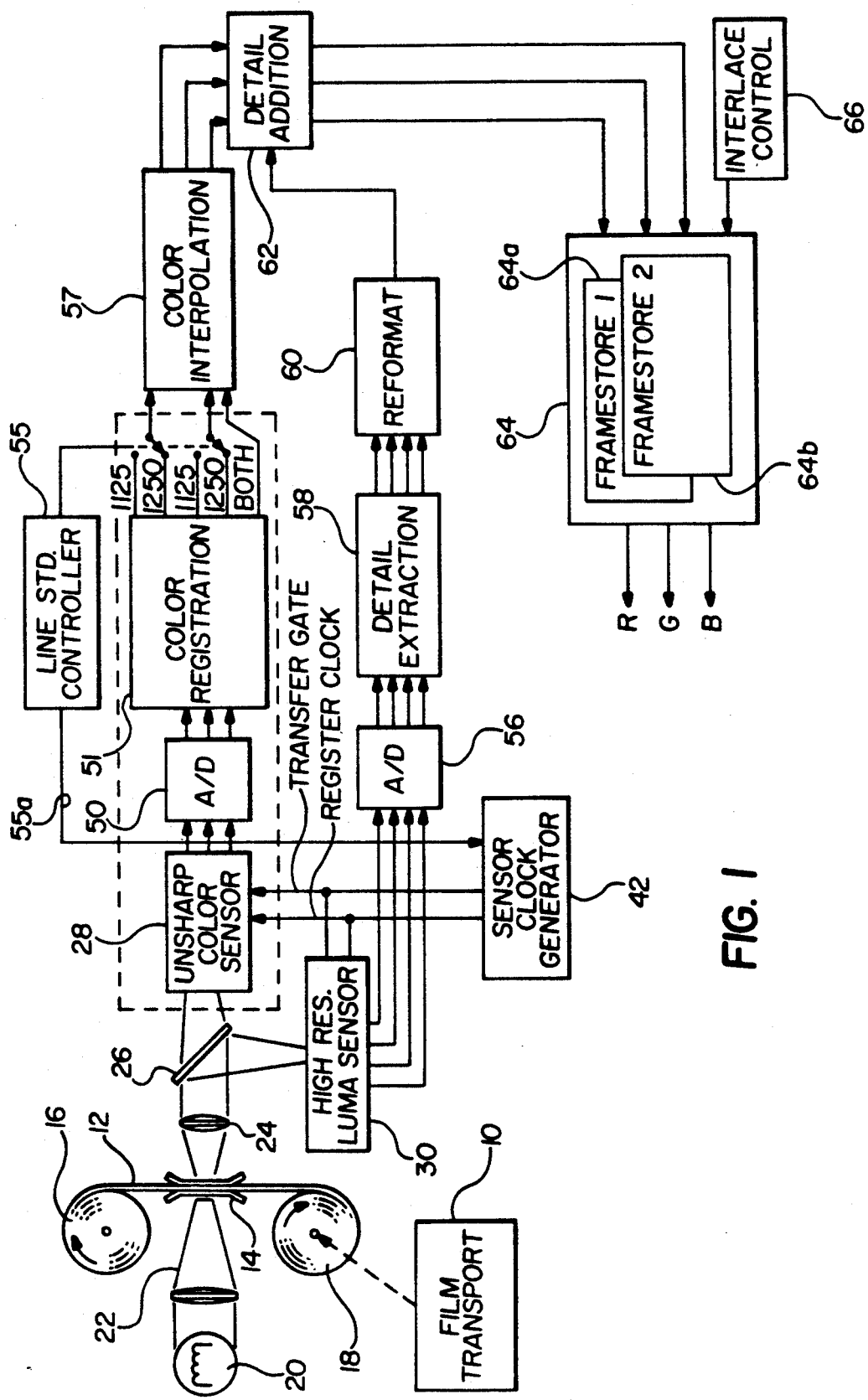
FIG. 1 is a block diagram of a high definition film scanner incorporating a linear sensor suited for two television line standards in accordance with the invention.

Referring first to FIG. 1, a film transport 10 advances a motion picture film 12 at a substantially uniform speed through a film gate 14 from a supply reel 16 to a take up reel 18. A light source 20 generates a light beam that is directed through a circle to line converter 22 and falls upon a linear section of the film 12 in the film gate 14. The light is modulated by the image in the film 12 and transmitted through an objective lens 24 to a beam splitter 26, which transmits one portion of the modulated light to an unsharp color sensor 28 and reflects the other portion to a high resolution luminance sensor 30.

The color sensor 28 comprises three color sensors respectively sensitive to red, green and blue light. The color sensor structure, which is better shown in FIG. 2, includes a red-sensitive linear CCD array 36r including photosites R1, R2, . . . , a green-sensitive linear CCD array 36 g including photosites G1, G2 , . . . , and a blue-sensitive linear CCD array 36b including photosites B1, B2 , . . . In this embodiment, each array 36r, 36g, 36b includes 960 active photosites. The spectral sensitization of the photosites is provided by linear color filter strips (not shown) applied to the sensor 28 and overlying the arrays 36r, 36g and 36b. Each linear array has associated therewith a respective transfer gate 38r, 38g, 38b separating each array from a respective output shift register 40r, 40g, 40b. Image charge accumulated in the charge wells of the respective arrays is transferred to the respective shift registers 40r, 40g, 40b by dropping the appropriate transfer gate 38r, 38g, 38b low. A sensor clock generator 42 (FIG. 1) provides an appropriate gating signal to the transfer gates 38r, 38g, 38b to effect charge transfer. In addition, the sensor clock generator 42 provides a clock signal of predetermined frequency for shifting the respective image signals from the output registers 40r, 40g, and 40b.

Figure 2:
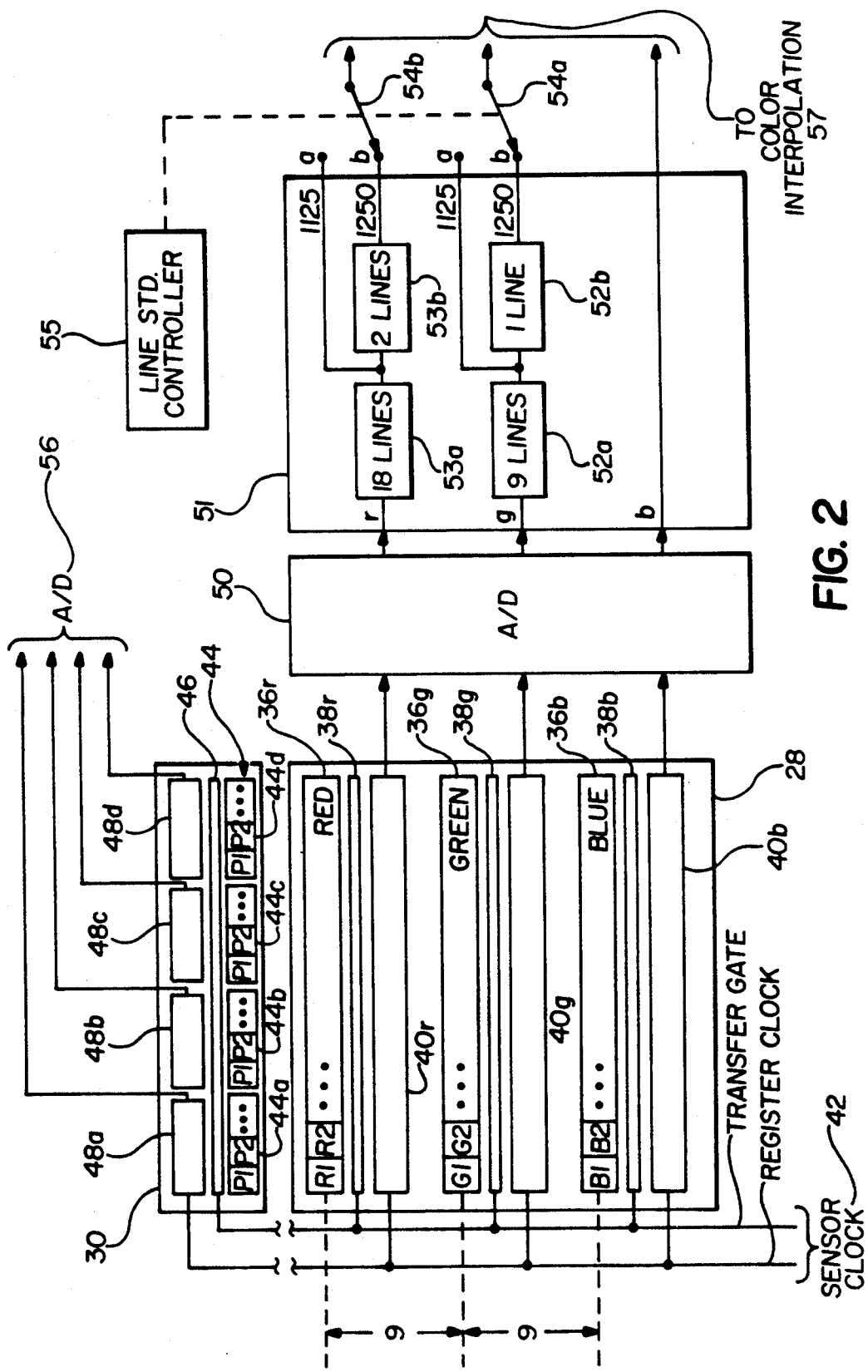
FIG. 2 is a detailed diagram of the linear color sensor shown in FIG. 1, showing also the respective line registration delays to achieve dual standards.

As further shown in FIGS. 1 and 2, the unsharp color sensor 28 provides three channels of color data to an analog-to-digital (A/D) converter 50, which digitizes the color data and applies the separate digitized channels to a color line registration circuit 51. Because the three color arrays 36r, 36g, 36b are spaced on the sensor 28 in the (page or frame) direction of film motion, the photosites being read at a different time correspond to different vertical locations on the film frame. This fixed mis-registration is corrected by the color registration circuit 51, which includes suitable line delays 52a, 52b, and 53a, 53b, for registering the color lines with each other and with the luminance line. In a film scanner of this type, the spacing of the arrays 36r, 36g, 36b on the substrate is generally selected to be an integral number of scanning lines for a particular television line standard.

From a sensor fabrication viewpoint a minimum array spacing required for a device to be used on an 1125 line high definition system would be 8 lines or 91.13 microns on the film. (This dimension is related to the sensor by multiplying this value by the optical magnification of the lens system, which in this embodiment is approximately 1.36 for Academy 35 mm film format. All subsequent dimensions discussed herein are also related to film dimensions in the Academy 35 format. Identical principles apply to other formats, and no change in sensor spacing or delay lines is required.) This would ordinarily suggest the use of 8 lines of delay in the green channel and 16 lines of delay in the red channel. If this sensor were to be operated on the proposed European 'Eureka' standard of 1250 lines, without alteration in the number of vertical delay elements used to register the signals, vertical color registration errors would result. The vertical mis-registration of two signals from adjacent color arrays would be equal to the array spacing (91.13 micron) minus 8 times the line spacing of the 1250 line system (81.11 micron), an error of approximately 10 microns or almost one line spacing. This is unacceptably large, and would result in visible color mis-registration. If, however, 9 lines of electronic delay are provided, in accordance with the teaching of this invention, when operating on the Eureka 1250 line standard the increased delay is equivalent to 92.12 micron on the film, and this is within 1.0 micron of the actual sensor spacing. For the red and green signals the error is now only approximately 10% of the line spacing. The red and blue arrays are separated by twice the spacing of the red and green and will produce twice the registration error.

Figure 3:
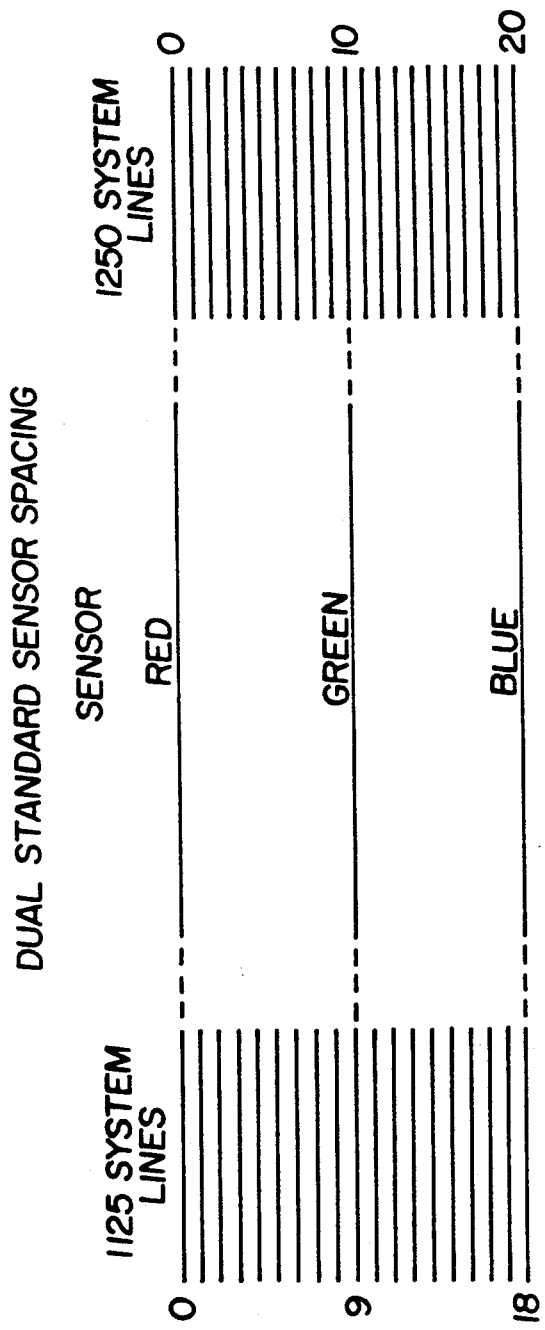
FIG. 3 is a line diagram helpful in explaining the substantial integral matching of two line standards.

The mis-registration on 1250 lines can be further reduced by increasing the array spacing to 9 lines for 1125 operation, i.e. from 91.13 to 102.52 microns on the film. On the 1125 line standard 9 line delays will now be needed to register green to blue and 18 to register red to blue. For 1250 line operation 10 lines will be needed for green to blue and 20 for red to blue. The registration error remaining on 1250 will be the difference between the array spacing and 10 line spacing for 1250, i.e. 102.52−102.3=0.18 micron. This corresponds to 1.8% of a line spacing and will produce a visually insignificant amount of vertical color mis-registration. FIG. 3 is helpful in showing the substantially integral line multiples achieved in each standard according to this invention.

As shown in FIG. 2, 9 lines of delay are provided by the delay 52a, and one additional line of delay by the delay 52b, in the green channel. Eighteen lines of delay are provided by the delay 53a, and two additional lines of delay by the delay 53b, in the red channel. The outputs of the 9 and 18 line delays 52a and 52b are directly connected to the poles a of ganged switches 54a and 54b while the outputs of the combined delays 52a and 52b (10 lines), and 53a and 53b (20 lines) are connected to the poles b of the switches 54a and 54b. The switches 54a and 54b are jointly controlled by a line standard controller 55, which selects between the 1125 or 1250 line standard and accordingly directs the appropriate standard output for subsequent processing.

When the line standard controller 55 selects one of the high definition line standards, the line integration time of the respective color sensors 36r, 36g, 36b is accordingly changed to produce the requisite number of lines (i.e., either 1125 or 1250) during the transit period of a portion of a film frame through the film gate 14, the aforesaid portion having the correct aspect ratio for the given standard (i.e., 16:9 for a high definition standard). Since the line integration time is controlled by the gating signal provided by the sensor clock generator 42 to the linear CCD arrays 36r, 36g, 36b, a line 55a feeds a line standard indication signal from the controller 55 to the sensor clock generator 42.

As further shown in FIG. 2, the luminance sensor 30 includes a linear array 44 sensitized to light having a spectral composition approximating a luminance function. The linear array 44 produces a full resolution signal sufficient for the requirements of either high definition standard, that is, the luminance array 44 includes a sufficient number of active photosites so as to correspond to the pixel resolution of either high definition standard. In this embodiment, the luminance array includes 1920 active photosites. The array 44 is divided into four like-sized segments 44a, 44b, 44c and 44d— each including a subset P1, P2, ... of photosites; in this embodiment, there are 480 active photosites in each segment. A transfer gate 46, connected to the sensor clock generator 42, is juxtaposed between the segments 44a, 44b, 44c, 44d and a corresponding plurality of output shift registers 48a, 48b, 48c, 48d, which are also connected to the sensor clock generator 42. With such an architecture, the image charges in all photosites in the array 44 are simultaneously gated to the output registers 48a, 48b, 48c, 48d and simultaneously shifted therefrom at one-quarter the clock frequency ordinarily needed for the high definition data rate, i.e., the data output rate of the luminance sensor 30 is four times the clock frequency applied to the individual output registers 48a, 48b, 48c and 48d.

The sensors 28 and 30 are illustrated next to each other in FIG. 2 to emphasize the relative arrangement of the linear arrays 36r, 36g, 36b and 44. It is of particular note that the color and luminance sensors 28 and 30 cover substantially the same linear dimension, but with different resolution. Low resolution, or unsharp, color is provided from the color arrays 36r, 36g, 36b by fewer photosites (960) than for luminance (1920). As described in copending Ser. No. 373,309, this provides lower color resolution in the horizontal scanning direction and allows the color photosites to be accordingly larger, which has the advantageous affect of increasing the signal-to-noise performance. In addition, color resolution in the vertical scanning direction is reduced by scanning one line of color for every two lines of luminance, thereby allowing the vertical color dimension to be increased (doubled) in relation to the luminance photosites. The total area of the color photosites is accordingly four times that of the luminance photosites. Taking further into account that the integration time of each color photosite is twice that of a luminance photosite (because each color line is read out half as frequently), the signal from the color photosites realizes an eight-fold noise improvement.

The three color arrays 36r, 36g and 36b are offset from each other by an integral number of lines so that, at any instant, three separate lines from the film 12 are imaged on the sensor 28. With the color arrays collecting light over a two (high definition) line period for each color line read out, the color arrays are spaced by an integral multiple of twice the high definition line spacing. In particular, in the 1125 line standard the 9 line spacing between the green array 36g and the blue array 36b is equivalent to 18 luminance or high definition lines, and the 18 line spacing between the green array 36g and the red array 36r is equivalent to 36 luminance or high definition lines. Similarly, in the 1250 line standard, the 10 line spacing corresponds to 20 luminance or high definition lines and the 20 line spacing corresponds to 40 luminance or high definition lines. The luminance sensor 30 may be aligned to a fourth, separate line or, via the beam splitter 26, to one of the color lines, say the line imaged upon the green-sensitive array 36g. The horizontal (line) scan is provided by transferring image charge from the linear arrays to the output registers, and accordingly clocking the signals from the registers. The vertical (frame) scan is provided by the motion imparted to the film 12 by the film transport 10 (FIG. 1), and allows for the requisite lines in a frame.

As described in copending Ser. No. 373,309, the luminance segments 44a, 44b, 44c, 44d are structured relative to the color arrays 36r, 36g, 36b so that the number of photosites in a color array is an integral multiple of the number of photosites in a luminance segment. As described herein, each color array has twice as many photosites as a luminance segment; specifically, each color array 36r, 36g, 36b has 960 photosites in relation to 480 photosites for each luminance segment 44a, 44b, 44c, 44d. The luminance registers 48a, 48b, 48c, 48d are read in parallel once for each line while the color registers 40r, 40g, 40b are read in parallel once for every two lines of luminance. Since there are twice as many photosites per register in color as in luminance and the color is read half as frequently, the numbers of photosites read per second is the same for color and luminance; consequently, only a single clock frequency is required to read out all of the registers 40r, 40g, 40b, 48a, 48b, 48c, 48d.

Referring again to FIG. 1, the luminance sensor 30 provides four channels of luminance data, one from each register 48a, 48b, 48c, 48d (FIG. 2), to plural analog-to-digital (A/D) converters shown as block 56. Depending on the registration of the luminance line relative to the color lines, a line delay may be inserted into the luminance channel(s) to register the luminance lines with a selected color line. Since the digital color values represent lower resolution data than the digital luminance values, additional color values are generated in a color interpolation circuit 57 in both the horizontal and vertical directions. Meanwhile, high frequency detail is extracted from the four channels of luminance data by a detail extraction circuit 58, which includes an array of high pass filters (not shown). The signals in the four luminance channels are aligned "end-to-end" to correspond to a physical line in a reformat circuit 60, which may, for example, be a conventional multiplexer triggered in quarter-line sequence to output a continuous detail signal.

The detail is added to each channel of color in an addition circuit 62, forming thereafter a full resolution, high definition color output signal. This high definition output signal is applied to an image store 64, which includes a first framestore 64a and a second framestore 64b. Recalling now that the high definition signal to this point is a sequential signal, an interlace controller 66 loads a video frame sequentially into one framestore while extracting video fields (of a previously loaded frame) in interlace format from the other framestore. A digital red, green, blue high definition field signal is thus provided at the output of the image store 64 for further use, which may include immediate broadcast transmission or recording, e.g., on video tape (after suitable standards conversion or encoding, as necessary). In any event, such further use is not to be part of the present invention.

Figure 4:
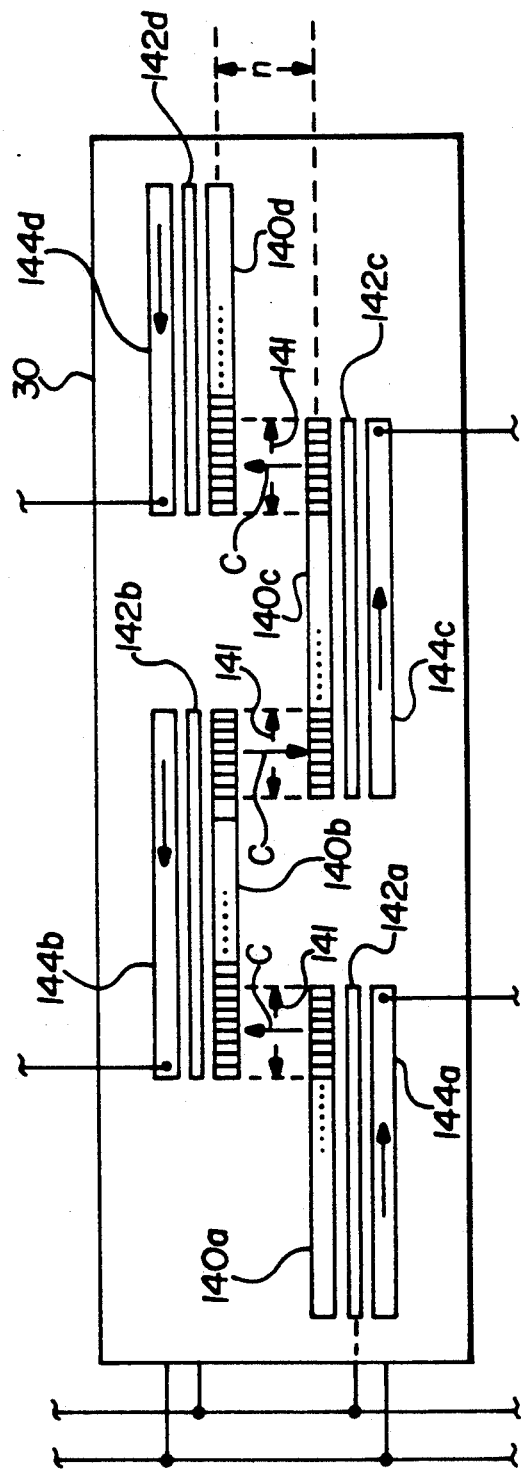
FIG. 4 is an alternative embodiment of the luminance sensor shown in FIG. 1, showing a linear structure suitable for use with dual standards in accordance with the invention.

An alternative embodiment of the high resolution luminance sensor 30 is shown in FIG. 4, and described more fully in Ser. No. 422,254, filed Oct. 16, 1989 in the name of H. J. Erhardt, assigned to the same assignee as the present invention, and incorporated herein by reference. (Ser. No. 422,254 is a commonly owned application for which the issue fee has been paid.) As further shown in FIG. 4, the luminance sensor 30 includes four like-sized segments 140a, 140b, 140c and 140d—each including a subset of a full line of photosites; in this embodiment, there are 480 active photosites in each subset plus four outer photosites at either end thereof. The segments are supported on the sensor substrate such that adjoining ends overlap by eight photosites (including the four outer photosites), defining an overlap region 141 between segments 140a and 140b, 140b and 140c, and 140c and 140d. Each full line output thus consists of partial lines of signals from the four segments 140a, 140b, 140c, and 140d joined together at crossover points indicated by the arrows c in FIG. 4. Four transfer gates 142a, 142b, 142c and 142d are juxtaposed between the segments 140a, 140b, 140c, and 140d and a corresponding plurality of output shift registers 144a, 144b, 144c, and 144d.

By staggering the linear segments and overlapping adjoining ends thereof as described in copending Ser. No. 422,254, the sampled signal outputs of the several segments can be applied to a series of digital filters that operate independently to provide filtered output signals that can be grouped together without processing artifacts at the crossover points. More particularly, the overlapping regions of the linear segments are configured in relation to the processing kernal required by the digital filters such that contiguous, processed samples on either side of each crossover point are derived from sample strings wholly within a respective linear segment.

The linear segments 140a and 140c are offset from the linear segments 140b and 140d by an integral number n of lines so that, at any instant, two separate lines from the film 12 are imaged by the objective lens 24 on the sensor 30. In accordance with the present invention, the integral number n can be chosen to also correspond to a substantially integral multiple of two television line standards. For example, n can be established at 9 luminance or high definition lines of the 1125 line standard, and also be substantially equivalent to 10 luminance or high definition lines of the 1250 line standard. Corresponding integral multiples of line delays in the respective channels, as described in connection with the color linear sensor 28, can then be used to select the output signals according to the standard in use. More particularly, a detail registration circuit (not shown), directly analogous to the color registration circuit 51, would be provided in the separate luminance channels with a ganged switch (analogous to switch 54 (FIG. 2)) for switching between the standards according to output from the time standard controller 55.

The invention has been described in detail with particular reference to a presently preferred embodiment, but it will be understood that variations and modifications can be effected within the spirit and scope of the invention. In particular, while the invention has been described for use in connection with high definition line standards, it is equally useful with other line standards. Moreover, line scanning apparatus according to the invention could also be adapted to more than two television standards, say, three high definition standards, by appropriate spacing equal to substantially integral multiples of all three (or more) standards.

What is claimed is:

1. Line scanning apparatus for scanning an original in a frame scanning direction according to either of two television standards, each standard defining a television line spacing appropriate for that standard, said apparatus comprising:

a plurality of linear arrays separated in the frame scanning direction by a predetermined spacing that constitutes substantially integral first and second multiples of the line spacing of the respective standards;

means for generating an output signal from each linear array;

means for registering the output signal from each linear array to the same television line, said registering means inserting first and second line delays into the signal path of at least one of the output signals, said line delays providing signal delays corresponding respectively to the first and second integral multiples of the line spacing of the respective standards; and means responsive to a selected television standard for switching between the respective line delays, whereby a standard output signal for the selected standard is taken from the respective delay.

2. Line scanning apparatus as claimed in claim 1 wherein said first integral multiple of the first line standard comprises n lines of the first standard, and said second integral multiple of the second line standard comprises n+m lines of the second standard.

3. Line scanning apparatus as claimed in claim 2 wherein the two television line standards are for high definition television, the first standard including 1125 lines per television frame and the second standard including 1250 lines per television frame.

4. Line scanning apparatus as claimed in claim 3 wherein n is at least 9 and m is at least 1, that is, the first integral multiple comprises at least 9 lines of the first television line standard, and the second integral multiple comprises at least 10 lines of the second television line standard.

5. Line scanning apparatus as claimed in claim 2 wherein the predetermined spacing of said linear arrays corresponds exactly to the first multiple of the line spacing of the first standard, and corresponds substantially to the second multiple of the line spacing of the second standard.

6. Line scanning apparatus as claimed in claim 5 wherein the first multiple is 9, and the second multiple is substantially equal to 10.

7. Line scanning apparatus as claimed in claim 1 wherein the plurality of linear arrays includes three color arrays respectively sensitized to red, green, and blue light.

8. Line scanning apparatus as claimed in claim 7 where said registering means inserts said first and second delays into one of the signal paths from one of said red, green, and blue arrays, and further inserts twice said first and second delays into the signal path from another of said red, green, and blue arrays.

9. Color line scanning apparatus for scanning a film original in a frame scanning direction according to either of two television line standards, each standard defining a television line spacing appropriate for that standard, said apparatus comprising:
   three linear arrays supported in the frame scanning direction by a predetermined spacing that constitutes substantially integral first and second multiples of the line spacing of the respective standards, said three arrays respectively sensitized to three separate colors;
   a signal generator for clocking an output signal from each linear array;
   means for registering the output signal from each linear array to the same television line, said registering means inserting first and second line delays into the signal path of a first output signal clocked from a first array, and third and fourth line delays into the signal path of a second output signal clocked from a second array, said first and third line delays corresponding to integral multiples of the first line standard, and said second and fourth line delays corresponding to integral multiples of the second line standard; and
   means responsive to a selected television standard for switching between the first and third line delays, and the second and fourth line delays, whereby a standard output signal for the selected standard is taken from the respective combination of delays.

10. Color line scanning apparatus as claimed in claim 9 wherein the two television line standards are for high definition television, the first standard including 1125 lines per television frame, and the second standard including 1250 lines per television frame.

11. Color line scanning apparatus as claimed in claim 10 wherein the first multiple is 9 and the second multiple is 10, and the predetermined spacing therefore constitutes substantially 9 lines of the first standard and substantially 10 lines of the second standard.

12. Color line scanning apparatus as claimed in claim 11 wherein said first and third line delays correspond to 9 and 18 lines, respectively, and said second and fourth line delays correspond to 10 and 20 lines, respectively.

13. Line sensing apparatus including plural linear arrays for linear scanning of a transparent original according to either of two television standards, each standard defining a television line spacing appropriate for that standard, the transparent original being driven at a uniform rate between the linear arrays and a light source in a page scanning direction Perpendicular to the linear dimension of the linear arrays, the improvement wherein the plural linear arrays are supported in the page scanning direction by a predetermined spacing that constitutes substantially integral multiples of the line spacing of both standards.

14. Line sensing apparatus as claimed in claim 13 wherein the plural arrays comprise three color-sensitive arrays supported on a common substrate.

15. Line sensing apparatus as claimed in claim 14 wherein the television standards comprise high definition standards of 1125 and 1250 lines, respectively, and the predetermined spacing comprises at least 9 lines of the 1125 line standard and at least 10 lines of the 1250 line standard.

* * * * *